US011298627B2

(12) United States Patent
Joe

(10) Patent No.: US 11,298,627 B2
(45) Date of Patent: Apr. 12, 2022

(54) COLLAPSIBLE KITE FRAME AND METHOD OF COLLAPSING A KITE FOR SHIPPING AND STORAGE

(71) Applicant: Randal W. Joe, Escondido, CA (US)

(72) Inventor: Randal W. Joe, Escondido, CA (US)

(*) Notice: Subject to any disclaimer, the term of this patent is extended or adjusted under 35 U.S.C. 154(b) by 463 days.

(21) Appl. No.: 16/233,435

(22) Filed: Dec. 27, 2018

(65) Prior Publication Data

US 2020/0206644 A1 Jul. 2, 2020

(51) Int. Cl.
*B64C 31/06* (2020.01)
*A63H 27/08* (2020.01)

(52) U.S. Cl.
CPC ............. *A63H 27/08* (2013.01); *B64C 31/06* (2013.01)

(58) Field of Classification Search
CPC .... A63H 27/08; A63H 27/007; A63H 27/082; B64C 31/06; B64C 31/032; E05D 11/1007; B65D 17/025
See application file for complete search history.

(56) References Cited

U.S. PATENT DOCUMENTS

| 957,528 | A | | 5/1910 | Wetteroth | |
| 1,328,143 | A | * | 1/1920 | Fergusson | A63H 27/08 244/153 R |
| 1,666,813 | A | * | 4/1928 | Eddy | A63H 27/08 244/154 |
| 1,846,496 | A | | 2/1932 | Mills | |
| 2,991,097 | A | * | 7/1961 | Vanwersch | E21D 15/43 403/91 |
| 3,076,626 | A | * | 2/1963 | Andrews | A63H 27/08 244/154 |
| 3,181,542 | A | | 5/1965 | Bareis | |
| 3,252,469 | A | | 5/1966 | Peake | |
| 3,457,931 | A | * | 7/1969 | Shimizu | A45B 19/10 135/25.3 |
| 3,838,703 | A | | 10/1974 | Zeigler | |
| 4,337,548 | A | | 7/1982 | Bonar | |
| 4,437,480 | A | * | 3/1984 | Husa | A61H 3/02 135/74 |
| 5,423,341 | A | | 6/1995 | Brady | |
| 5,710,870 | A | | 1/1998 | Ohm et al. | |
| 5,884,646 | A | | 5/1999 | Ju | |
| 5,937,882 | A | | 8/1999 | Harbaugh | |
| 6,353,969 | B1 | * | 3/2002 | LeMole | B60J 7/1204 114/361 |
| 6,371,873 | B1 | * | 4/2002 | Wang | A63B 63/004 273/407 |

(Continued)

FOREIGN PATENT DOCUMENTS

EP 0534843 3/1993

*Primary Examiner* — Medhat Badawi
*Assistant Examiner* — Vicente Rodriguez
(74) *Attorney, Agent, or Firm* — Buche & Associates, P.C.; John K. Buche; Bryce A. Johnson

(57) ABSTRACT

Disclosed is a collapsible kite frame that permits at kite to be fit into an economical shipping box, thereby significantly decreasing the costs associated with shipping. The kite frame utilizes a double revolute joint to connect the support members of a kite frame. A support sheath locks the joint and support members in a straight alignment, but, when removed, the support members are free to rotate and move inward, towards each other, thereby shortening the combined length span of the support members when in a straight alignment.

5 Claims, 6 Drawing Sheets

(56) References Cited

U.S. PATENT DOCUMENTS

| | | |
|---|---|---|
| 6,612,713 B1 | 9/2003 | Kuelbs |
| 6,868,858 B2 | 3/2005 | Suh |
| 7,007,967 B2 * | 3/2006 | Goettker ................ B60D 1/155 280/479.2 |
| 7,168,439 B2 | 1/2007 | Patel et al. |
| 2018/0249837 A1 | 9/2018 | Cohen |
| 2018/0252000 A1 | 9/2018 | Parry et al. |

* cited by examiner

COLLAPSIBLE KITE FRAME AND METHOD OF COLLAPSING A KITE FOR SHIPPING AND STORAGE

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of kite construction.

Background of the Invention

Kites rely on a large surface area to interact with wind to create a lift that will sustain the kite's flight in the air. A sturdy, reaching kite frame is necessary to stretch fabric along the length of the frame and provide this surface area. While essential for keeping kites in flight, a large kite frame is bulky and expensive to ship. To combat this cumbersome and inflexible nature, many kite frames now feature break apart components (meaning parts that disassemble), which allow the kite to be deconstructed for shipping and storage purposes and reassembled later. However, current deconstructible frames are largely inadequate as they fail to collapse the kite frame to such a size as to avoid extra costs associated with its shipping; they can be cumbersome or complicated to reassemble; or worse, they may suffer from structural weakness once reassembled. Also, many kites when disassembled cause loss of parts, or there are simply too many parts that have to be reassembled.

The inability to adequately break down (meaning disassemble) a kite frame that can be reassembled with suitable strength often necessitates use of larger framed boxes for shipping of the larger kite frames. Larger shipping boxes require larger fees to cover the shipping costs associated with the transport of plus-sized parcels. This is because shipping costs are usually a function of both weight and product dimensions. The more awkward or large the dimension, the more expensive the shipment—even if the weight is relatively low. The additional cost to ship via oversized boxes is burdensome on consumers and businesses, who must absorb this extra cost. Thus, a need exits for a collapsible kite frame that permits the kite to be fit into an economical shipping box, thereby significantly decreasing the costs associated with shipping the kite.

SUMMARY OF THE INVENTION

In view of the foregoing, an object of this specification is to disclose a method of constructing and deconstructing a kite such that the kite may be folded to fit into an economical shipping box. The present invention provides a double revolute joint that may accomplish rotation between the joint and the support members of a kite frame. A central link connects two rigid support members in a manner that permits each support member to rotate relative to the central link. The dual rotation of the support members allows the support members to move inward, towards each other, thereby shortening the length span of the support members when in a straight alignment.

A support sheath, typically a rigid component with a tunneled opening, slides over the support members to encompass the central link and the connecting portions of the support members. When covering the central link and connecting portions of the support members, the rotation of the support members relative to the central link is inhibited—locking the support members in a straight alignment. When the support sheath is not covering the central link and connecting portions of the support members, the support members are free to rotate relative to the central link, thereby allowing the kite frame to collapse inward and fit inside an economical shipping box. Thus, the support sheath, combined with the double revolute joint mechanism allows for slide and lock type of mechanism for the kite frame. Overall, this mechanism also permits rapid assembly and disassembly of a kite frame (without losing pieces that have to be found prior to reassembly), and it permits, paradoxically, the shipping of extremely wide wingspan kites into relatively small and inexpensive shipping boxes.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

In the figures, the following components are represented by the corresponding reference numerals:
Double revolute joint—1000;
First support member—2000;
   First support member connection tab—2100.

First support member lateral connection columns—2200;
Second support member—3000;
   Second support member connection tab—3100;
   Second support member lateral connection columns—3200;
   Locking tab—3300;
Support sheath—4000;
   Locking opening—4100;
Central link—5000;
   Lateral prongs—5100;
   Side openings—5200;
   First insertion hub—5300;
   Second insertion hub—5400; and
Shipping box—6000.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is a method of deconstructing a kite such that the folded kite may fit into an economical shipping box measuring about 8 inches by 18 inches.

Figure 1:
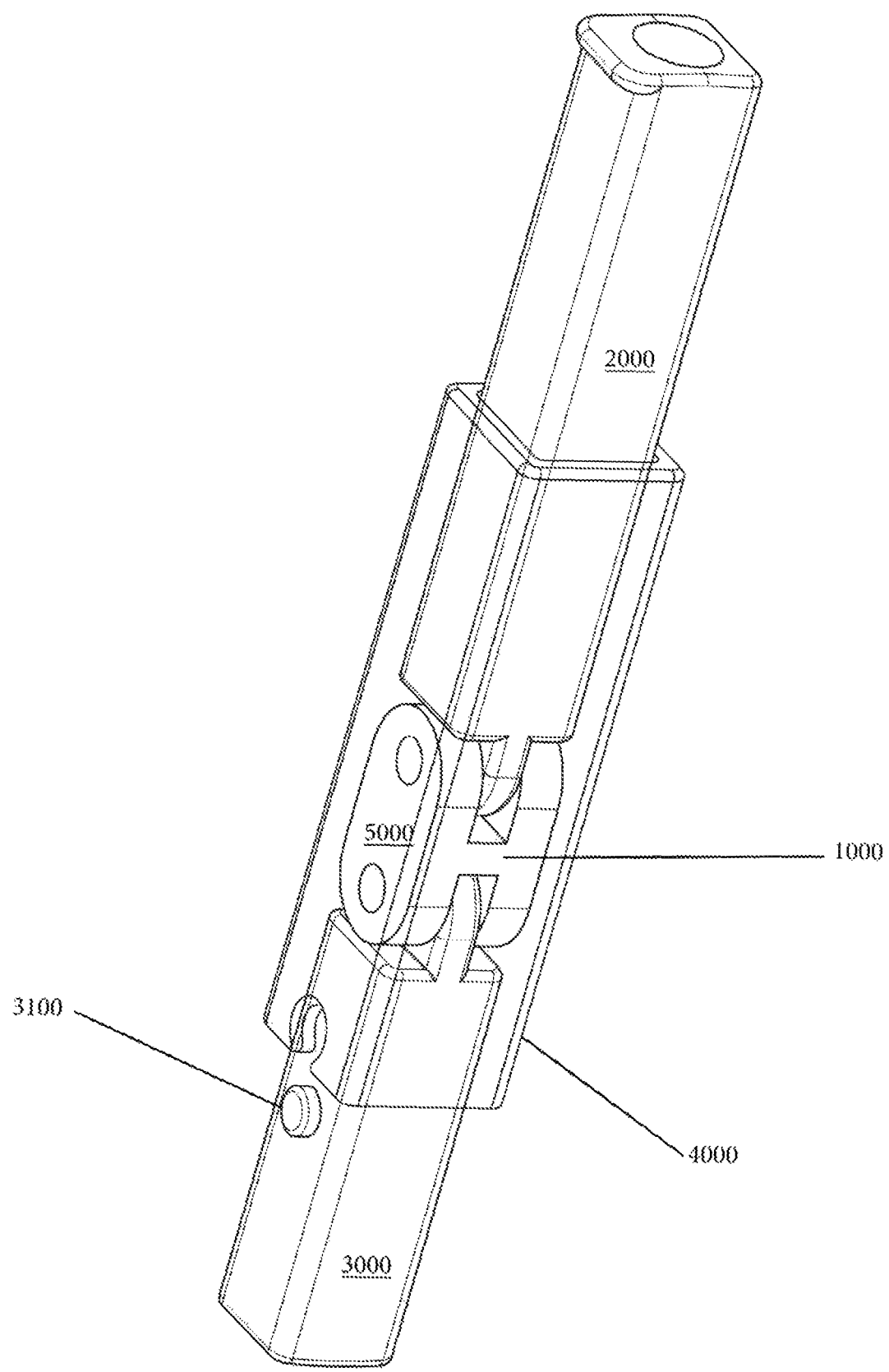
FIG. 1 is a perspective view of the double revolute joint showing the components underlying the support sheath.

As shown in FIG. 1, the double revolute joint 1000 comprises a first support member 2000, a central link 5000, a second support member 3000, and a support sheath 4000. The support sheath 4000 features a through tunneled opening, allowing the support sheath 4000 to fully encompass the double revolute joint 1000. The support sheath 4000 may be locked into place covering the double revolute joint by connecting a locking tab 3100 on the second support member 3000 to the lock opening 4100 on the support sheath 4000.

Figure 2:
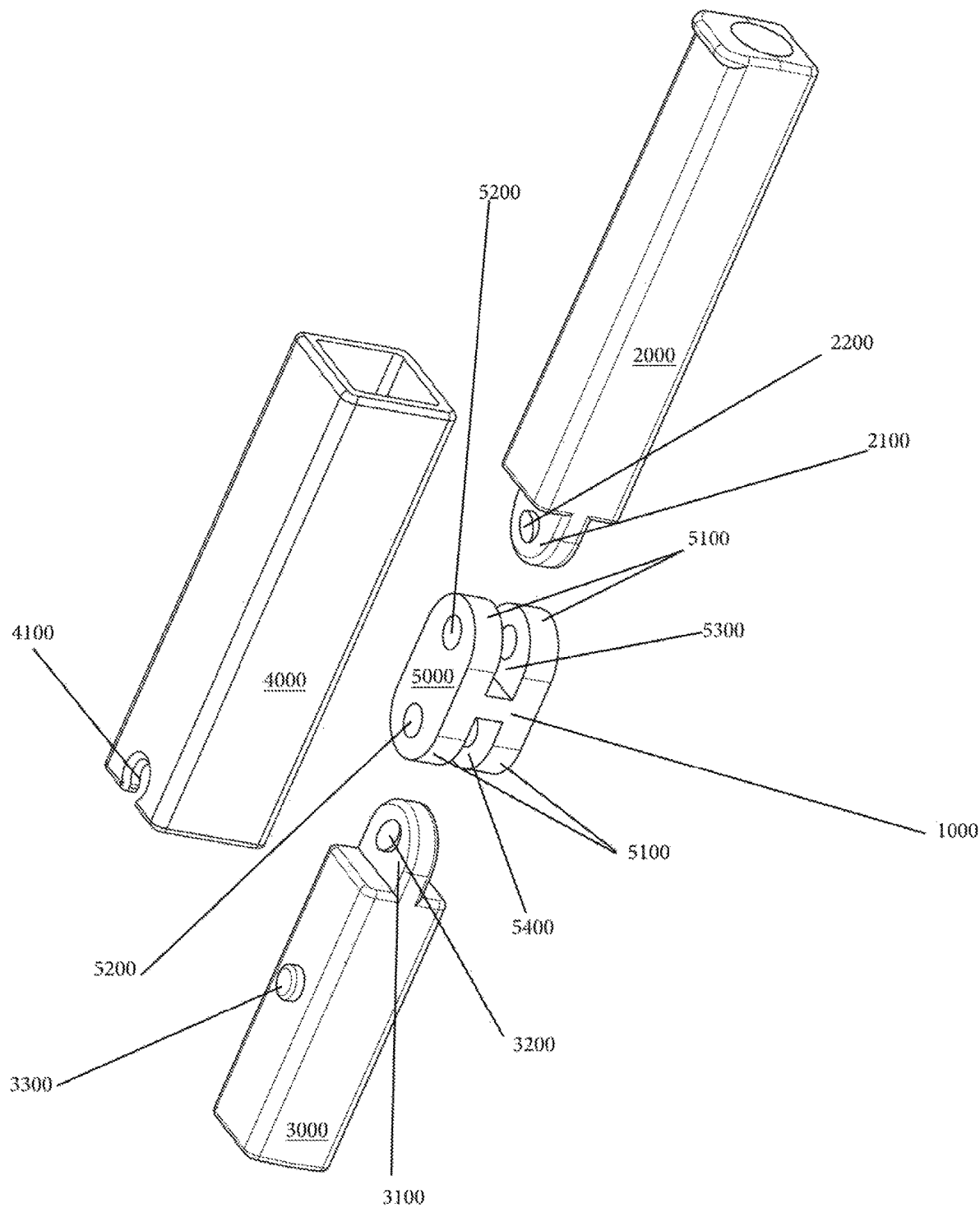
FIG. 2 is an exploded view of the double revolute joint.

FIG. 2 shows an exploded view of the double revolute joint 1000. As shown, the first support member 2000 features a first support member connection tab 2100 with first support member lateral connection columns 2200 that protrude outward from the connection tab 2100. Similarly, the second support member 3000 features a second support member connection tab 3100 with second support member lateral connection columns 3200 that protrude outward from the connection tab 3100. The central link 5000 features lateral prongs 5100 that extend outward on both ends of the central link 5000, resembling an "H" shape. The lateral prongs 5100 create channeled openings (insertion hubs 5300, 5400) through which the connection tabs of the first and second support members (2100, 3100) are inserted.

As shown, the central link 5000 features lateral prongs 5100 which protrude from the center of the central link 5000. The protrusion of the lateral prongs 5100 creates two channels (insertion hubs 5300, 5400) through which the connection tabs of the first and second support members (2100, 3100) are inserted. The lateral prongs 5100 further feature side openings 5200, through which the lateral connection columns of the first and second support members (2200, 3200) are inserted, thereby securing the first and second support members (2000, 3000) to the central link 5000. The first support member connection tab 2100 is inserted into the first insertion hub 5300 such that the first support member lateral connection columns 2200 pass through the side openings 5200 of the lateral prongs 5100, thereby preventing the first support member 2000 from disconnecting from the central link 5000, yet simultaneously allowing a rotational movement. Likewise, the second support member connection tab 3100 is inserted into the second insertion hub 5400 such that the second support member lateral connection columns 3200 pass through the side openings 5200 of the lateral prongs 5100, thereby preventing the second support member 3000 from disconnecting from the central link 5000, yet simultaneously allowing a rotational movement.

Figure 3:
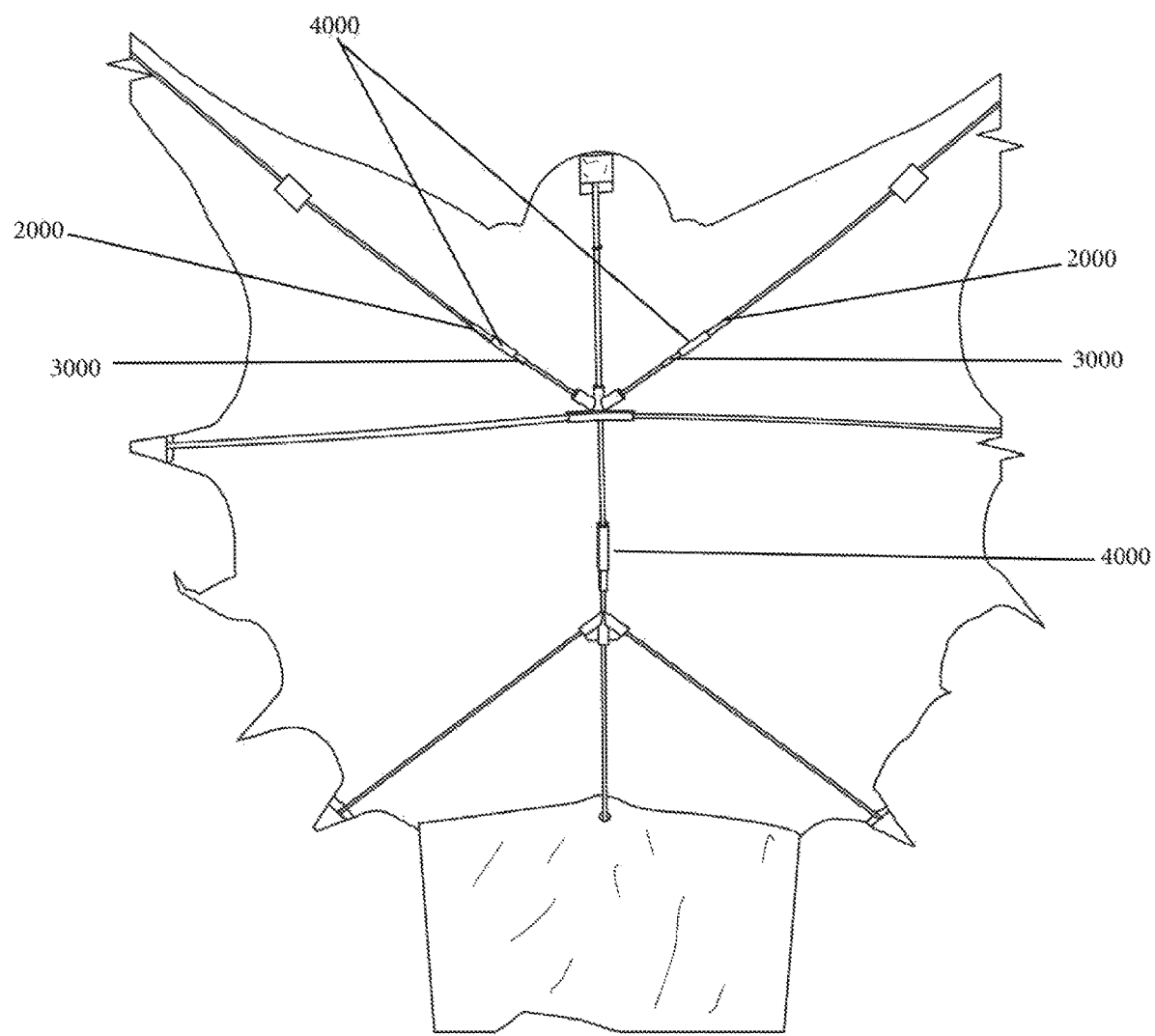
FIG. 3 is an environmental view of the double revolute joint assembled in a kite frame.

FIG. 3 shows an environmental view of the double revolute joint 1000 locked in a straight alignment by sliding the support sheath 4000 over the central link 5000 and the connection tabs of the first and second support members (2100, 3100). Locking the support sheath 4000 over the double revolute joint 1000 creates a rigid frame construction, permitting the kite to withstand the forces of stretched fabric across the frame. The construction disclosed herein results in a superior construction and strength of kites having large dimensions with the additional ease of compact and inexpensive shipping in relatively small containers.

Figure 4:
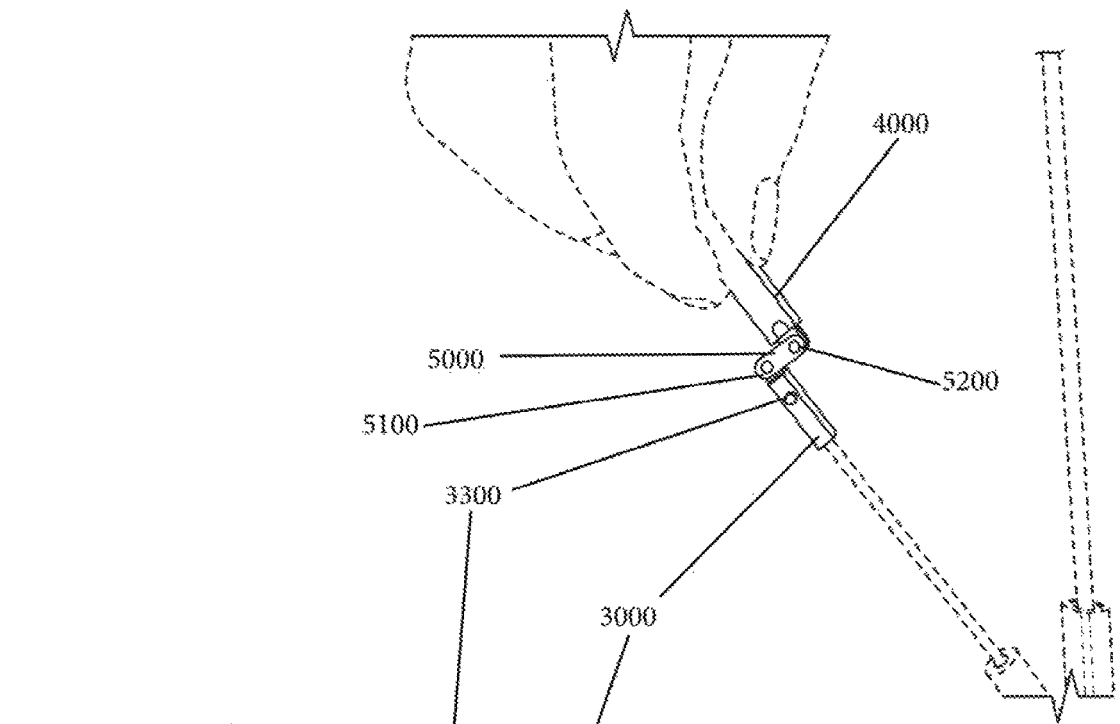
FIG. 4 is a perspective view of the double revolute joint being disassembled.
Figure 5:
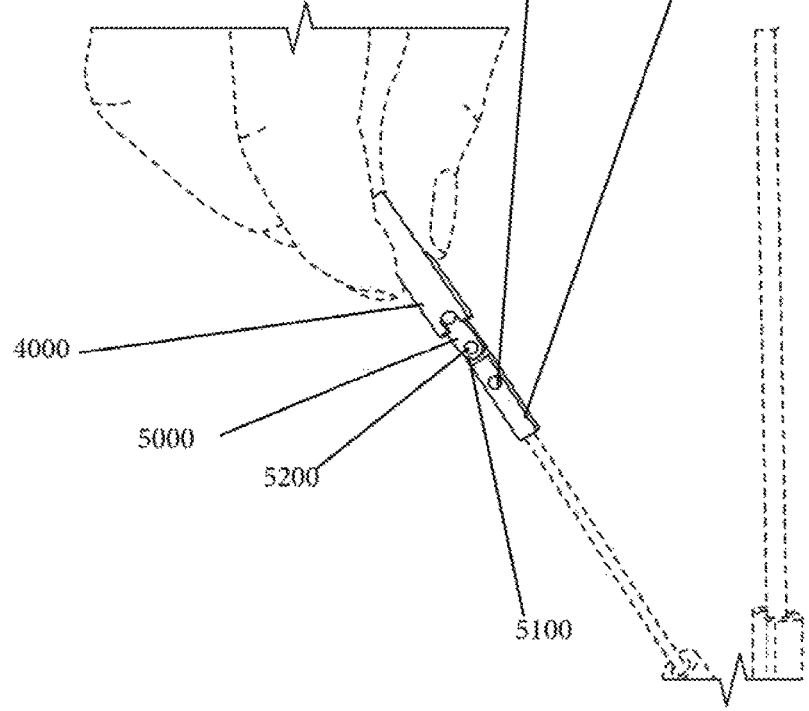
FIG. 5 is a perspective view of the double revolute joint being assembled.

FIGS. 4 and 5 show the double revolute joint 1000 in use. As shown in FIG. 4, the connection between the insertion hubs (5300, 5400) (shown in FIG. 2) of the central link 5000 and the connection columns of the first and second support members (2200, 3200) (shown in FIG. 2) permits the first and second support members (2000, 3000) to rotate with respect to the central link 5000. The corresponding circular shapes of the first and second support member lateral connection columns (2200, 3200) (shown in FIG. 2) and encompassing side openings 5200 of the lateral prongs 5100 permit the first and second support member lateral connection columns (2200, 3200) (shown in FIG. 2) to rotate within the side openings 5200. This rotation motion allows the first and second support members (2000, 3000) to move inward, towards each other, such that the support members (2000, 3000) overlap, and thereby shorten the length span of the first and second support members (2000, 3000) together without disconnecting the first and second support members (2000, 3000).

Figure 6:
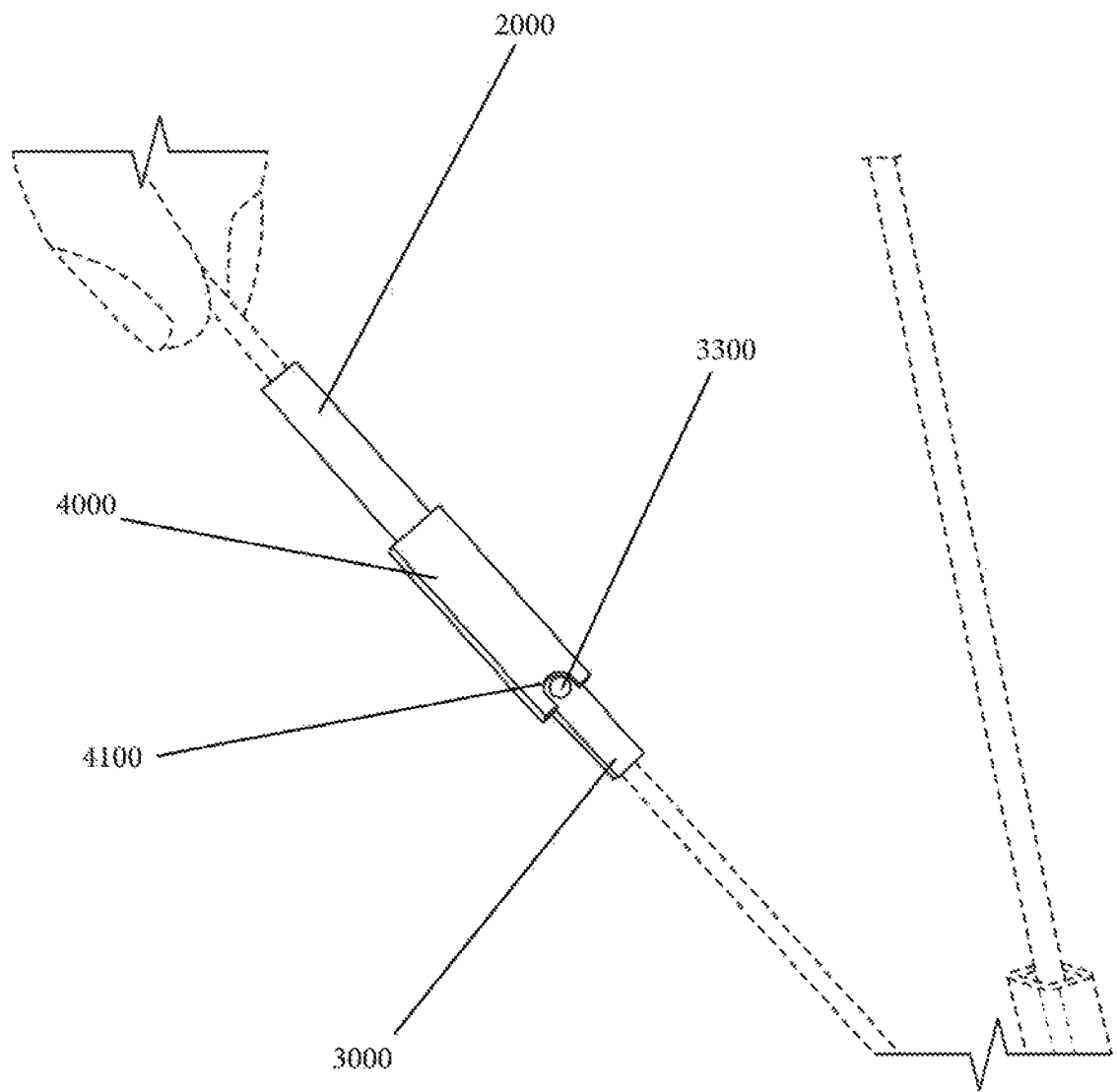
FIG. 6 is a perspective view of the double revolute joint assembled.

FIGS. 5 and 6 show the double revolute joint 1000 being straightened and secured with the support sheath 4000. As shown in FIG. 5, the support sheath 4000 encompasses the first support member 2000 when not in use. When the support sheath 4000 is not in use, the first and second support members (2000, 3000) are able to rotate with respect to the central link 5000 via the revolution of the first and second support member lateral connection columns (2200, 3200) (shown in FIG. 2) within the side openings 5200. FIG. 6 shows the support sheath 4000 when in use to support the double revolute joint 1000. The support sheath 4000 slides laterally along the first support member 2000 towards the double revolute joint 1000 such that it encompasses the entirety of the central link 5000 and covers the first and second support member connection tabs (2100, 3100) (shown in FIG. 2) connected to the first and second insertion hubs (5300, 5400) (shown in FIG. 2) of the central link 5000. The rigidity of the support sheath 4000 acts to prevent the rotation of the first and second support member lateral connection columns (2200, 3200) (shown in FIG. 2) within the side openings 5200 of the lateral prongs 5100 of the central link 5000, thereby locking the first and second support members (2000, 3000) in a straight alignment.

Still referring to FIG. 6, the support sheath 4000 features a lock opening 4100 which corresponds in the shape to the locking tab 3300 of the second support member 3000. The support sheath 4000 slides laterally along the first support member 2000, over the central link 5000, and connects to the second support member 3000 via lock opening 4100 which encompasses the locking tab 3300 of the second support member 3000. As shown, when the lock opening 4100 is connected to the locking tab 3300, the support sheath 4000 encompasses the central link 5000, and the first and second support member connection tabs (2100, 3100) (shown in FIG. 2) of the first and second support members (2000, 3000).

Figure 7:
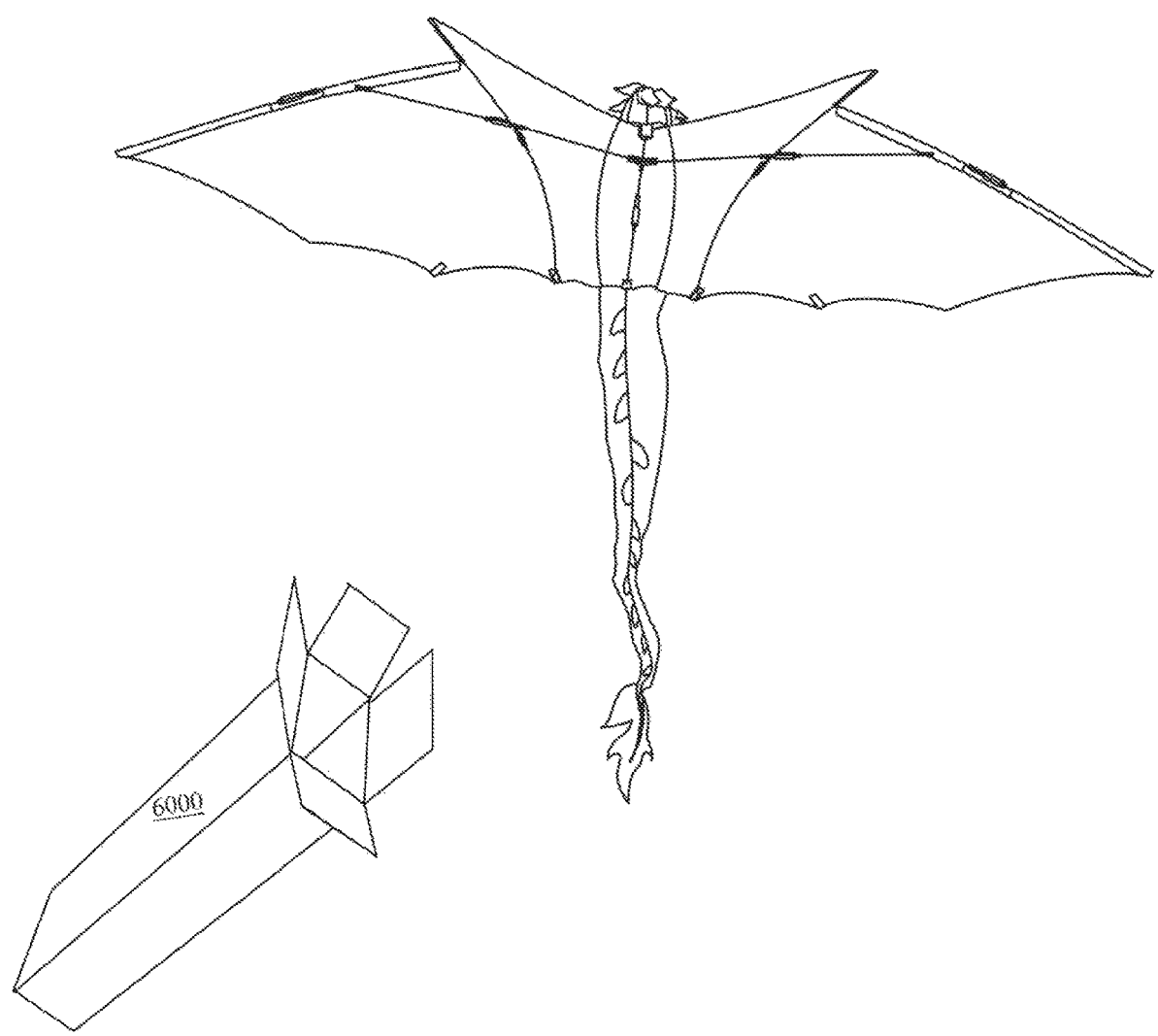
FIG. 7 is an environmental view of a kite next to an economical shipping box.

FIG. 7 shows a common shipping box 6000 measuring 18 inches (length) by 8 inches (width) by 1.5 inches (height) and a standard kite. The kite depicted in FIG. 7 is not limiting as to the variation in dimensions and style of the kites that may be collapsed and contained within the common shipping box referenced. Kites with wing spans ranging from 4.7 inches to 93 inches and heights ranging from 3.1 inches to 305 inches may be collapsed with the use of double revolute joints to fit within the common shipping box referenced above. Referring back to FIGS. 4 and 5, when folding the kite, a person will slide the support sheath 4000 away from the central link 5000, toward the first support member 2000, such that the first and second support members (2000, 3000) are each free to rotate with respect to the central link 5000. The rotation of the first and second support member (2000, 3000) results in a shortening of the span of the support members, permitting a kite of larger portions to be folded and fit within the economical shipping box 6000 shown of FIG. 7. Referring still to FIGS. 4 and 5, when removing the kite from the shipping box 6000, a user may align the first and second support members (2000, 3000), slide the support sheath 4000 over the central link 5000, and connect the locking tab 3300 with the lock opening 4100, thereby securing the first and second support members (2000, 3000) in a rigid line. Once the first and second support members (2,000, 3,000) are secured in a rigid line, the material of the kite will be stretched out and ready for flight.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:
1. A kite frame that comprises:
   a first support member with a first support member connection tab that has a first support member lateral connection column that protrudes outward from the first support member connection tab,
   a second support member with a second support member connection tab that has a second support member lateral connection column that protrudes outward from the second support member connection tab,
   a double revolute joint defined by a central link with
      a first pair of lateral prongs that form a first insertion hub that has received both the first support member connection tab and the first support member lateral connection column so that the first support member lateral connection column is positioned within a first side opening of one of the first pair of lateral prongs to establish a first rotatable joint, and
      a second pair of lateral prongs that form a second insertion hub that has received both the second support member connection tab and the second support member lateral connection column so that the second support member lateral connection column is positioned within a second side opening of one of the second pair of lateral prongs to establish a second rotatable joint,
   a support sheath that is slid over said first and second rotatable joint;
   wherein the double revolute joint rotatably connects the first support member to the central link via the first rotatable joint and wherein the double revolute joint rotatably connects the second support member to the central link via the second rotatable joint such that the first support member and second support member each rotate when the support sheath is removed from being slid over said first and second rotatable joint so as to transition from a straight alignment to one where the support members overlap, thereby truncating the combined length span of the support members.

2. The apparatus of claim 1 wherein said support sheath further defines a locking tab for holding said sheath firmly in place.

3. The apparatus of claim 1 wherein said lateral connection columns conform in shape to the openings in the lateral prongs and insert into openings of the said lateral prongs, thereby connecting the first support member and second support member to the central link and permitting rotation of the first support member and second support member.

4. The apparatus of claim 3 wherein the support sheath is moveable relative the first support member, central link, and second support member such that the support sheath slides laterally along the first support member and connects to the second support member, thereby encompassing the entirety of the central link.

5. The apparatus of claim 4 wherein the support sheath further comprises a lock opening that secures the connection of the support sheath to the second support member.

* * * * *